United States Patent
Harris et al.

[11] Patent Number: 5,867,904
[45] Date of Patent: Feb. 9, 1999

[54] METHOD OF MAKING AN AUTOMOTIVE HEAT EXCHANGER WITH INDENTED PINS

[75] Inventors: Matthew K. Harris, Lewisville; Michael L. Snyder, Wylie; Peter J. Breiding, Arlington, all of Tex.

[73] Assignee: Zexel USA Corporation, Decatur, Ill.

[21] Appl. No.: 939,355

[22] Filed: Sep. 29, 1997

(Under 37 CFR 1.47)

Related U.S. Application Data

[63] Continuation-in-part of Ser. No. 627,264, Apr. 4, 1996, abandoned.

[51] Int. Cl.$^6$ ....................................................... B23P 15/26
[52] U.S. Cl. ................................. 29/890.046; 29/890.054
[58] Field of Search ....................... 29/890.054, 890.046; 228/183; 165/152, 153, 181, 183

[56] References Cited

U.S. PATENT DOCUMENTS

| | | |
|---|---|---|
| 1,401,918 | 12/1921 | Neveu . |
| 1,421,546 | 7/1922 | Parkin . |
| 1,950,500 | 3/1934 | Loprich et al. . |
| 2,347,957 | 5/1944 | McCullough . |
| 2,571,505 | 10/1951 | Waldron . |
| 2,692,119 | 10/1954 | Morse . |
| 3,190,352 | 6/1965 | Simpelaar . |
| 5,240,068 | 8/1993 | Tokutake . |
| 5,361,829 | 11/1994 | Kreutzer et al. . |
| 5,476,140 | 12/1995 | Lu . |
| 5,685,075 | 11/1997 | Kato .................................. 29/890.054 |
| 5,761,811 | 6/1998 | Ito ..................................... 29/890.054 |

*Primary Examiner*—I Cuda
*Attorney, Agent, or Firm*—James E. Bradley

[57] ABSTRACT

A heat exchanger of the type used for a condenser in a vehicle air conditioning system includes a pair of parallel, tubular headers which are spaced apart with a plurality of refrigerant flow tubes extending between the headers. The flow tubes have upper and lower flat sides, and forward and rearward outermost edges. The forward and rearward outermost edges longitudinally extend the length of the flow tubes to define forward and rearward outermost planes of the flow tubes, respectively. A plurality of serpentine fins have alternately disposed ridges and furrows which define upper and lower crests. Portions of some of the crests are indented to provide recesses, with tabs extending from one end of the crests. The tabs extend outward and in contact with one of the edges of the flow tubes. The headers and serpentine fins are brazing clad for passing through a brazing furnace to braze the headers and serpentine fins to the flow tubes. The heat exchanger is brazed while in a horizontal plane. The tabs of the fins prevent the fins from slipping downward during brazing.

14 Claims, 2 Drawing Sheets

5,867,904

METHOD OF MAKING AN AUTOMOTIVE HEAT EXCHANGER WITH INDENTED PINS

REFERENCE TO RELATED APPLICATION

This invention is a continuation-in-part application of Ser. No. 08/627,264, filed Apr. 4, 1996 abandoned.

TECHNICAL FIELD

This invention relates in general to heat exchangers, and in particular to a condenser with indented fins having tabs for retaining the fins between refrigerant flow tubes.

BACKGROUND ART

Heat exchangers, such as parallel flow condensers used in vehicle air conditioning systems, have been manufactured from aluminum components which assembled and then passed through a brazing furnace to braze the components together into a single unit. The components typically include header tanks, refrigerant flow tubes and fin stock. The header tanks and fin stock are brazing clad and will braze to the flow tubes when passed through a brazing furnace. The components are assembled so that the refrigerant flow tubes extend between the header tanks, parallel to one another. The fin stock is aligned to extend between the refrigerant flow tubes, with lengths of the fin stock extending parallel to the refrigerant flow tubes. The assembled components are mounted to a brazing fixture to hold the components in proper alignment as they are passed through the brazing furnace.

Prior art brazing fixtures have metal bars and metal bands for holding the fin stock in alignment with the refrigerant flow tubes. The fin stock is formed from corrugated strips of brazing clad aluminum sheet metal which are flexible and require mechanical support to extend for any significant length between the refrigerant flow tubes. The metal bars and bands of brazing fixtures are spaced apart along the length of the fin stock and refrigerant flow tubes, and will not always adequately support the fin stock. The fin stock can then become misaligned with and extend outward from the refrigerant flow tubes, resulting in a condition called "high fin." If the fin stock protrudes outward from the refrigerant flow tubes beyond acceptable tolerances, it results in an unacceptable defect which will require rework or scrapping of the heat exchangers.

SUMMARY OF THE INVENTION

An apparatus and method provide a heat exchanger of the type used for a condenser in a vehicle air conditioning system. The heat exchanger includes a pair of parallel, tubular headers which are spaced apart with a plurality of refrigerant flow tubes extending between the headers. The flow tubes have upper and lower flat sides, and forward and rearward outermost edges. The forward and rearward outermost edges longitudinally extend the length of the flow tubes to define forward and rearward outermost planes of the flow tubes, respectively. A plurality of serpentine fins have alternately disposed ridges and furrows which define upper and lower crests. A portion of the crests are indented to provide recesses, with tabs extending from one of the ends of the crests. The tabs extend outward and adjacent to the one of the edges of the flow tubes, and retain the flow tubes within the recesses formed into the crests. The headers and serpentine fins are brazing clad for passing through a brazing furnace to braze the headers and serpentine fins to the flow tubes. The tabs of the fins braze to the outermost edges of the flow tubes, and the recessed portions of the crests of the fins braze to the contact surfaces of the flow tubes.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
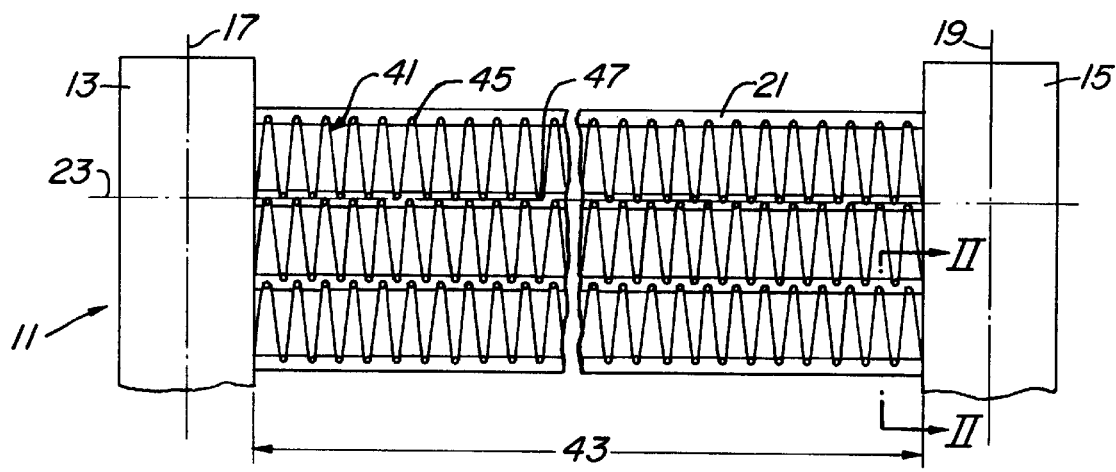
FIG. 1 is a side, elevational view of a heat exchanger of the type used for a condenser in an automotive air conditioning system.

FIG. 1 is a side, elevational view of heat exchanger 11 of the present invention, which is shown as a condenser for an vehicle air conditioning system. Heat exchanger 11 includes two brazing clad tubular headers 13, 15 having longitudinal axes 17, 19, respectively. A plurality of parallel refrigerant flow tubes 21 extend between tubular header 13, 15. Flow tubes 21 have longitudinal axes 23 which are perpendicular to the longitudinal axes 17, 19 of tubular headers 13, 15.

Figure 2:
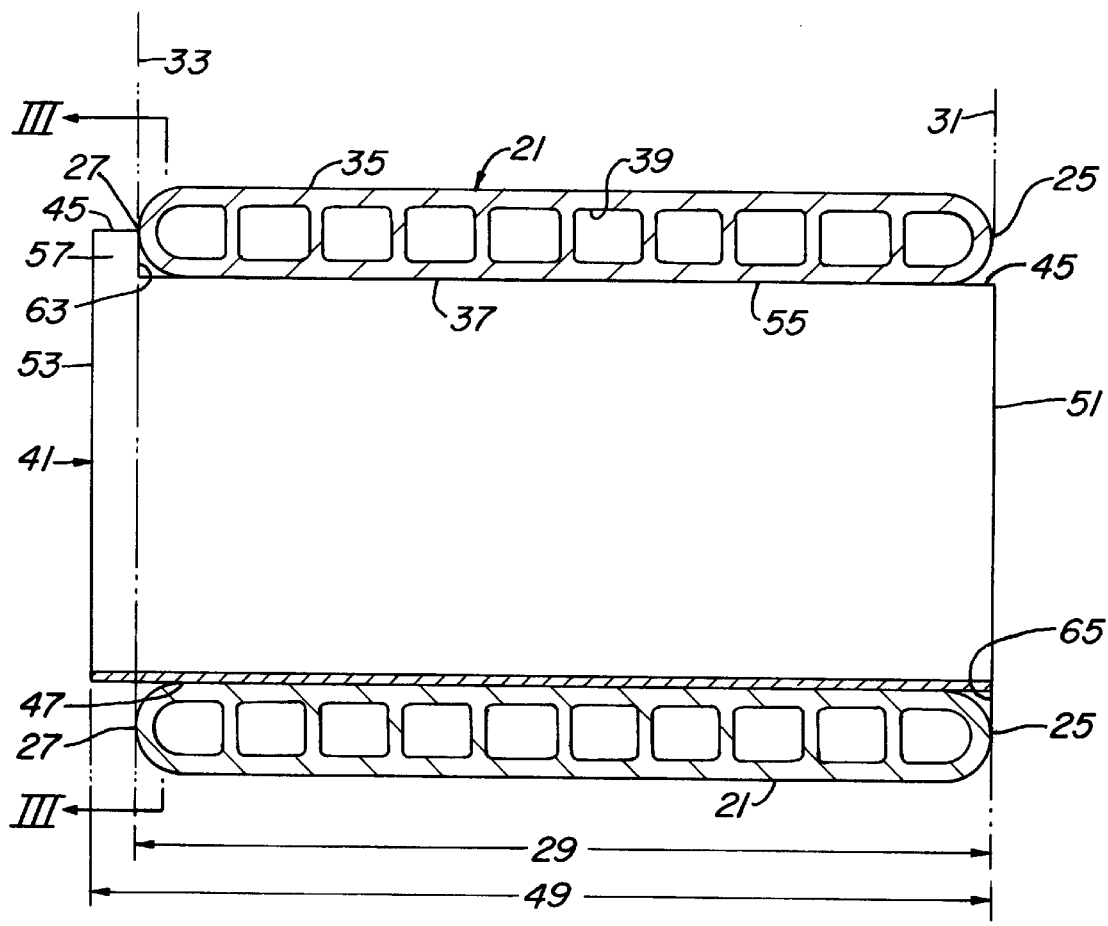
FIG. 2 is a partial section view the heat exchanger of FIG. 1 taken along section lines II—II.

FIG. 2 is a partial section view of heat exchanger 11, taken along section line II—II of FIG. 1. Flow tubes 21 have forward outermost edges 25 and rearward outermost edges 27. Flow tubes 21 have a width 29 which extends between forward outermost plane 31 and rearward outermost plane 33. Forward outermost plane 31 is defined by the forward outermost edges 25 of flow tubes 21, and rearward outermost plane 33 is defined by rearward outermost edges 27 of flow tubes 21. Flow tubes 21 are extruded members made of aluminum. Flow tubes 21 do not extend outward of forward and rearward outermost planes 31, 33, such that flow tubes 21 have outermost edges 25, 27 and only extend between planes 31, 33.

Each of flow tubes 21 preferably have flat contact surfaces 35, 37, with side 35 being an upper surface and side 37 being a lower surface. Each of surfaces 35, 37, forward outermost edge 25 and rearward outermost edge 27 together define an exterior flow tube profile for each of flow tubes 21. A plurality of flow passages 39 separately extend as separately defined flow passages through each of flow tubes 21, parallel to the longitudinal axes 23 (shown in FIG. 1) of flow tubes 21.

FIGS. 1 and 2 show serpentine fins 41 of heat exchanger 11, alternately disposed with flow tubes 21. Fins 41 have length 43 which extends from the inner side of header 13 to the inner side of header 15. Serpentine fins 41 are formed from fin stock of brazing clad, corrugated, aluminum strips having ridges providing upper crests 45 and furrows providing lower crests 47. Each of serpentine fins 41 have widths 49 which extend between outward edges 51 and outward edges 53. Widths 49 are preferably the same and extend perpendicular to longitudinal axes 23 of flow tubes 21. Width 49 is slightly greater than flow tube width 29 as shown in FIG. 2.

Indentations into a portion of upper crests 45 of serpentine fins 41 provide recesses 55. Recesses 55 may alternately be lower crests 45, but preferably are not in both. Each recess 55 extends from rearward edge 51 to a protuberance or tab 57 located at forward edge 53. Tabs 57 could alternately be located at rearward edge 51, but preferably are not located at both edges 51, 53. Tabs 57 are located outward from and in contact with forward edges 25 of flow tubes 21 to retain fins 41 between flow tubes 21. Each tab has an inner shoulder 63 at the junction with recess 55 which abuts one of the flow tube forward edges 25.

Figure 3:
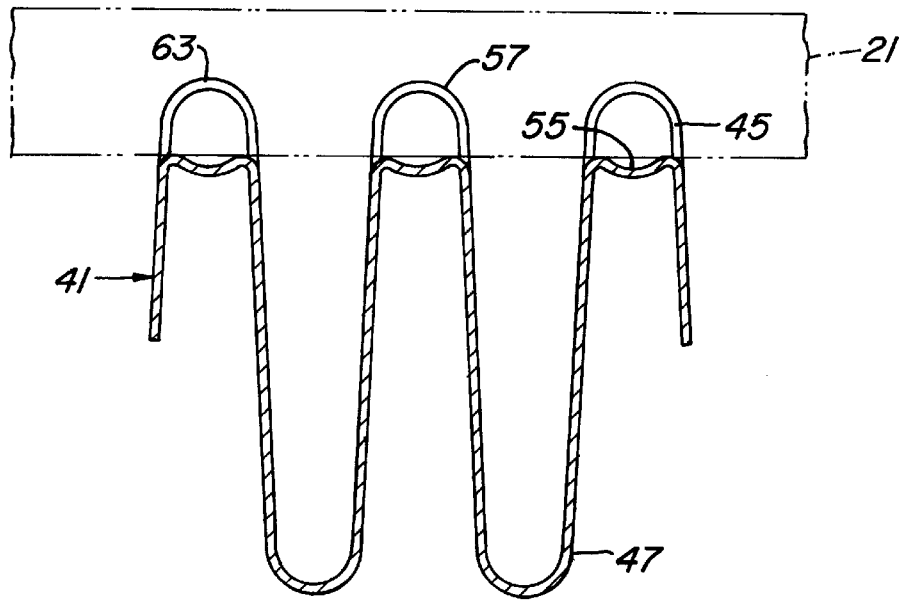
FIG. 3 is a sectional view of the indented serpentine fins of the heat exchanger of FIG. 2 taken along section line III—III, and depicts a refrigerant flow tube in phantom.

FIG. 3 is a sectional view depicting serpentine fins 41 of heat exchanger 11, taken along section line III—III of FIG. 2, with one of refrigerant flow tubes 21 shown in phantom. Each tab 57 is generally U-shaped, having a rounded configuration. To form recess portions 55, a portion of upper crests 45 is bent downward from the forward edge portion at forward edge 53. 47, generally flattening recess portions 55. Each recess portion 55 engages the lower contact surface 37 of one of the flow tubes 21.

Figure 4:
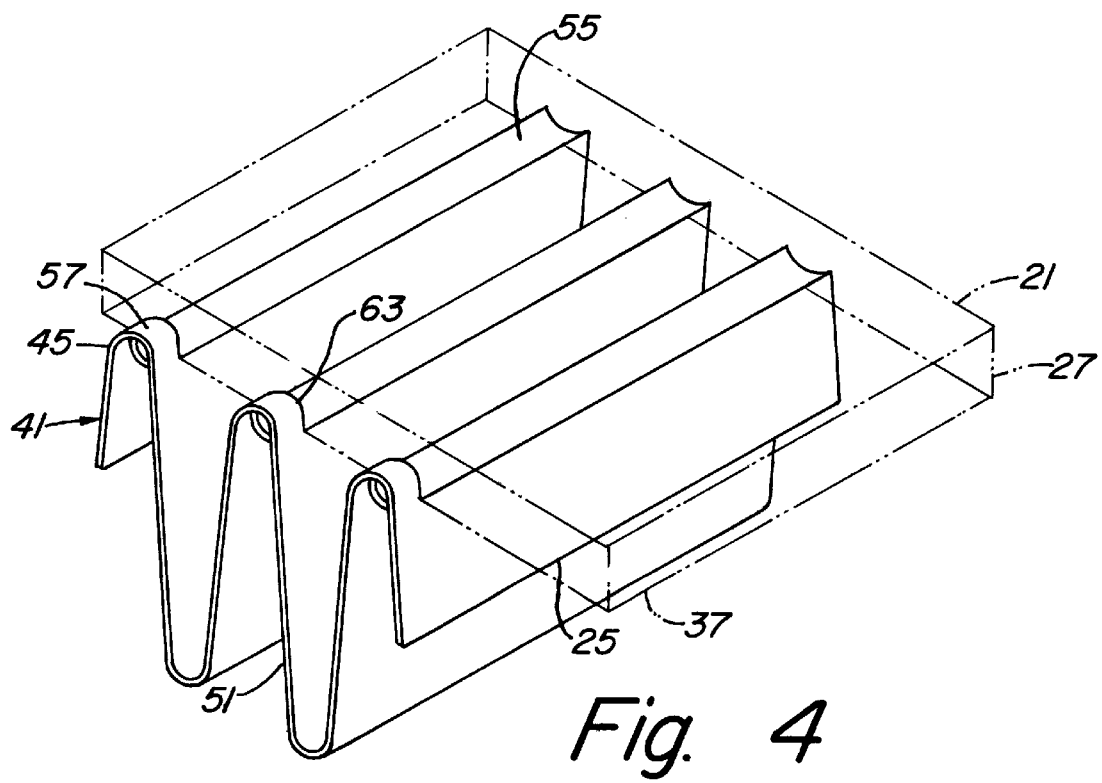
FIG. 4 is a partial perspective view of one of the indented serpentine fins of FIG. 3 engaging a refrigerant flow tube, which is shown in phantom.

FIG. 4 depicts a perspective view of a portion of one of serpentine fins 41, with a portion of one of flow tubes 21 shown in phantom extending across upper crests 45. Recesses 55 cradle flow tube 21 with tabs 57 extending on the forward edge 25 of flow tube 21. Shoulders 63 abut forward edge 25 to hold fins 41 in position relative to the flow tubes 21 as the assembly is passed through a brazing furnace. Serpentine fins 41 are brazing clad for passing through a brazing furnace to braze tabs 57 to outermost edges 25 of tubes 21, and to braze recess portions 55 to lower contact surfaces 37 of flow tubes 21. Fillets of brazing material form where serpentine fins 41 engage flow tubes 21.

To manufacture heat exchanger 11, a first one of serpentine fins 41 is placed adjacent to a lower contact surface 37 of a first one of flow tubes 21, with recesses 55 of the first one of fins 21 engaging the lower contact surface 37. Tabs 57 will contact flow tube forward edge 25. Fin lower crests 47 contact upper contact surface 35 of the second flow tube 21. The above method steps are repeated to dispose fins 41 between the remainder of flow tubes 21. Tubular headers 13, 15 are fitted onto the opposite ends of flow tubes 21, with flow passages 39 of flow tubes 21 aligning with apertures through the sides of headers 13, 15. There will only be a single row or bank of fins 21. This results in a heat exchanger assembly which has a total core width equal to fin width 49.

The heat exchanger assembly is secured to a brazing fixture in the alignment shown in FIG. 1. The brazing fixture is a clamp which holds flow tubes 21 to headers 13, 15. It does not, however, exert any significant pressure against fins 41. The assembly is placed in a horizontal orientation with forward plane 31 generally horizontal. Tabs 57 will be located on an upper side of heat exchanger 11 while oriented horizontal so as to prevent fins 41 from slipping downward relative to flow tubes 21. Tabs 57 will maintain fin forward edges 53 in a common plane. Heat exchanger 11 and the fixture are passed through a brazing furnace while in the horizontal orientation to braze the components together into a single unit.

The present invention has advantages over prior art heat exchangers. The recesses provided by indentations into the serpentine fins made according to the present invention retain the serpentine fins in position with respect to the flow tubes. This prevents high fin as the flow tubes and serpentine fins are passed through a brazing furnace and brazed together.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments which fall within the true scope of the invention.

We claim:

1. A method for manufacturing a parallel flow heat exchanger, the method comprising the steps of:

providing a pair of tubular headers and a plurality of flow tubes, each of the flow tubes having a length measured along a longitudinal axis, a width measured between forward and rearward edges, and substantially flat opposite facing contact surfaces;

providing a plurality of serpentine fins, each of the serpentine fins being a strip having a length substantially equal to the length of the flow tubes, a width measured between forward and rearward edges which is slightly greater than the width of one of the flow tubes, and alternating ridges and furrows which define first and second crests;

providing each of the fins with a locating tab on the first crests at one of the edges of the fins;

alternately positioning the flow tubes and the serpentine fins together, forming a core assembly having a width substantially equal to the width of one of the fins;

placing the headers on opposite ends of the flow tubes, with the headers spaced apart and parallel to one another, forming a heat exchanger assembly;

orienting the heat exchanger assembly so that the core assembly is generally horizontal with the tabs located on an upper side of the core assembly and in abutting engagement with one of the edges of at least some of the tubes to prevent the fins from sliding downward relative to the tubes; then while maintaining the heat exchanger assembly generally horizontal, passing the heat exchanger assembly through a brazing furnace to braze the headers, flow tubes and serpentine fins together into a single unit.

2. The method according to claim 1, wherein the step of providing each of the fins with a locating tab comprises bending a first portion of each of the first crests relative to an edge portion of the first crests.

3. The method according to claim 1, further comprising securing the heat exchanger assembly to a fixture prior to passing the heat exchanger assembly through the furnace.

4. The method according to claim 1, wherein the step of providing each of the fins with a locating tab comprises forming an edge portion of one of the crests into a generally U-shaped configuration to define the tab and generally flattening a remaining portion of said one of the crests.

5. The method according to claim 1, wherein the step of providing each of the fins with a locating tab comprises forming a locating tab only on one of the edges of each of the first crests.

6. The method according to claim 1, wherein the step of providing each of the fins with a locating tab comprises forming a locating tab only on one of the edges of the first crests and not on any of the second crests.

7. A method for manufacturing a parallel flow heat exchanger, the method comprising the steps of:

(a) providing a pair of tubular headers and first and second flow tubes, each of the flow tubes having a length measured along a longitudinal axis, a width measured between forward and rearward edges, the first and second flow tubes having generally flat contact surfaces which face one another;

(b) providing a metal strip having a width from a forward edge to a rearward edge slightly greater than the width of one of the flow tubes;

(c) bending the metal strip into a serpentine fin having undulations with first and second sets of crests;

(d) forming tabs and recessed portions on the first set of crests, with each of the tabs being located on one of the edges of the strips and protruding past the recessed portion in a direction transverse to the longitudinal axis to define a shoulder at a junction between each of the tabs and each of the recessed portions;

(e) positioning the serpentine fin between the flow tubes, with the longitudinal axes of the flow tubes parallel, with the first crests in contact with the contact surface of the first flow tube and the second crests in contact with the contact surface of the second flow tube;

(f) abutting the shoulder of each of the tabs against one of the edges of one of the first flow tube and placing each of the recessed portions against the contact surface of the first flow tube;

(g) placing the headers on opposite ends of the flow tubes, with the headers spaced apart and parallel to one another to define a heat exchanger assembly;

(h) securing the assembly to a fixture and orienting the assembly generally horizontal and with the tabs on an upper side of the assembly to prevent the fin from sliding downward relative to the tubes; and then, (i) passing the assembly and fixture through a brazing furnace to braze the headers, flow tubes and serpentine fin together into a single unit.

8. The method according to claim 7, wherein step (d) comprises forming the tabs and the recessed portions only on the first crests and not on the second crests.

9. The method according to claim 7, wherein step (d) comprises forming the tabs only on one of the edges of the fin and not on the other of the edges of the fin.

10. The method according to claim 7, wherein step (d) comprises forming the tabs and the recessed portions only on the first crests and not on the second crests, and forming the tabs only on one of the edges of the fin and not on the other of the edges of the fin.

11. A method for manufacturing a parallel flow heat exchanger, the method comprising the steps of:

(a) providing a pair of tubular headers and first and second flow tubes, each of the flow tubes having a length measured between ends, a width measured between forward and rearward edges, and a generally flat contact surface;

(b) providing a metal strip having a width from a forward edge to a rearward edge of the strip slightly greater than the width of one of the flow tubes;

(c) bending the metal strip into a serpentine fin having undulations with first and second sets of crests;

(d) forming tabs and recessed portions on the first set of crests, with the tabs being generally U-shaped and protruding in a past the recessed portion, each of the tabs having an outer edge portion coinciding with one of the edges of the strips and a shoulder joining one of the recessed portions, each of the recessed portions being generally flattened;

(e) positioning the serpentine fin between the flow tubes, with the flow tubes parallel to each other;

(f) abutting each of the shoulders of the tabs of the fins against one of the edges of the first flow tube and placing the recessed portions against the contact surfaces of the first flow tube to define a core assembly which has a width that is substantially the same as the width of the fin;

(g) placing the headers on opposite ends of the flow tubes, with the headers spaced apart and parallel to one another to define a heat exchanger assembly;

(h) securing the assembly to a fixture and orienting the heat exchanger assembly such that the core assembly is generally horizontal with the tabs located on an upper side of the core assembly to prevent the fin from slipping downward relative to the tubes; and then, (i) passing the assembly and fixture through a brazing furnace to braze the headers, flow tubes and serpentine fin together into a single unit.

12. The method according to claim 11, wherein step (d) comprises forming the tabs and the recessed portions only on the first crests and not on the second crests.

13. The method according to claim 11, wherein step (d) comprises forming the tabs only on one of the edges of the fin and not on the other of the edges of the fin.

14. The method according to claim 11, wherein step (d) comprises forming the tabs and the recessed portions only on the first crests and not on the second crests, and forming the tabs only on one of the edges of the fin and not on the other of the edges of the fin.

\* \* \* \* \*